United States Patent
Chew et al.

(10) Patent No.: US 12,450,451 B1
(45) Date of Patent: Oct. 21, 2025

(54) PARSER FOR PART IDENTIFIERS

(71) Applicant: THE BOEING COMPANY, Arlington, VA (US)

(72) Inventors: Yien Hoong Chew, Kent, WA (US); John J. Yu, Seattle, WA (US); Joseph Kreitle, Mukilteo, WA (US); Nguyen C. Lam, Kent, WA (US)

(73) Assignee: The Boeing Company, Alexandria, VA (US)

( * ) Notice: Subject to any disclaimer, the term of this patent is extended or adjusted under 35 U.S.C. 154(b) by 0 days.

(21) Appl. No.: 18/789,080

(22) Filed: Jul. 30, 2024

(51) Int. Cl.
   *G06K 7/10* (2006.01)

(52) U.S. Cl.
   CPC .................. *G06K 7/10366* (2013.01)

(58) Field of Classification Search
   CPC ........................................... G06K 10/366
   USPC ........................................................ 235/451
   See application file for complete search history.

(56) References Cited

U.S. PATENT DOCUMENTS

2006/0287890 A1\* 12/2006 Stead .................. G16H 10/20
                                                            705/3

\* cited by examiner

*Primary Examiner* — Toan C Ly
(74) *Attorney, Agent, or Firm* — Joseph M. Butscher; The Small Patent Law Group LLC

(57) ABSTRACT

The present disclosure describes a system that uses a configuration file to store the parsing instructions for the information encoded by the RFID tags. In one aspect, an apparatus includes a memory and a processor communicatively coupled to the memory. The processor receives, from a radio frequency identifier (RFID) scanner, a first binary sequence produced by scanning a first RFID tag on a first part and translates the first binary sequence into a first textual sequence comprising a field key and a field string. The processor also locates, in a configuration file, parsing instructions for the field key, parses the field string according to the parsing instructions to produce origin information for the first part, and displays the origin information.

20 Claims, 10 Drawing Sheets

PARSER FOR PART IDENTIFIERS

FIELD

Aspects of the present disclosure relate to part identification and tracking. For example, certain aspects of the present disclosure relate to a parser for part identifiers.

BACKGROUND

The tracking and monitoring of parts (e.g., in an aircraft or rocket) may be heavily regulated and may be a cumbersome process. In some existing systems, as aeronautical parts are assembled into an aircraft, information about the parts is manually entered into a tracking system. Manual entry of the information, however, may result in typos or errors that make it more difficult to track the pedigree and/or service life of the aeronautical parts.

Some systems use radio frequency identifier (RFID) tags to track the aeronautical parts. The RFID tags encode the information about the aeronautical parts. When the aeronautical parts are assembled into the aircraft, the RFID tags are scanned to enter the information encoded in the RFID tags into the tracking system. An intermediate step in the process of entering the information involves translating and parsing the information encoded by the RFID tags. In these systems, the parsing instructions that describe how to parse the information encoded by the RFID tags are hardcoded into the software in the system. As a result, when updates or changes need to be made to the instructions (e.g., adding instructions for new types of information and/or removing instructions for outdated or discontinued information), the software code needs to be changed and the software needs to be recompiled. This process of changing and recompiling the software may be slow and cumbersome.

SUMMARY

The present disclosure describes a system that uses a configuration file to store the parsing instructions for the information encoded by the RFID tags. In one aspect, an apparatus includes a memory and a processor communicatively coupled to the memory. The processor receives, from a radio frequency identifier (RFID) scanner, a first binary sequence produced by scanning a first RFID tag on a first part and translates the first binary sequence into a first textual sequence comprising a field key and a field string. The processor also locates, in a configuration file, parsing instructions for the field key, parses the field string according to the parsing instructions to produce origin information for the first part, and displays the origin information.

The parsing instructions may include the field key and an expression indicating a structure for the origin information in the field string.

The processor may receive a change to the parsing instructions and update the configuration file based on the change.

Translating the first binary sequence into the first textual sequence may include translating, using a library, the first binary sequence into a hexadecimal value and translating, using a specification, the hexadecimal value into the first textual sequence.

The processor may receive, from the RFID scanner, a second binary sequence produced by scanning a second RFID tag on a second part and translate the second binary sequence into a second textual sequence. The processor may determine, based on the configuration file and the second textual sequence, that the second RFID tag includes an error and display a message indicating the error.

The origin information may include at least one of a part number for the first part, a serial number for the first part, or a manufacturing date for the first part.

The processor may validate the field string based on the parsing instructions.

In another aspect, a method includes receiving, from a radio frequency identifier (RFID) scanner, a first binary sequence produced by scanning a first RFID tag on a first part and translating the first binary sequence into a first textual sequence comprising a field key and a field string. The method also includes locating, in a configuration file, parsing instructions for the field key, parsing the field string according to the parsing instructions to produce origin information for the first part, and displaying the origin information.

The parsing instructions may include the field key and an expression indicating a structure for the origin information in the field string.

The method may include receiving a change to the parsing instructions and updating the configuration file based on the change.

Translating the first binary sequence into the first textual sequence may include translating, using a library, the first binary sequence into a hexadecimal value and translating, using a specification, the hexadecimal value into the first textual sequence.

The method may include receiving, from the RFID scanner, a second binary sequence produced by scanning a second RFID tag on a second part and translating the second binary sequence into a second textual sequence. The method may include determining, based on the configuration file and the second textual sequence, that the second RFID tag includes an error and displaying a message indicating the error.

The origin information may include at least one of a part number for the first part, a serial number for the first part, or a manufacturing date for the first part.

The method may include validating the field string based on the parsing instructions.

In another aspect, a non-transitory computer readable medium stores instructions that, when executed by a processor, cause the processor to receive, from a radio frequency identifier (RFID) scanner, a first binary sequence produced by scanning a first RFID tag on a first part and translate the first binary sequence into a first textual sequence comprising a field key and a field string. The processor also locates, in a configuration file, parsing instructions for the field key, parses the field string according to the parsing instructions to produce origin information for the first part, and displays the origin information.

The parsing instructions may include the field key and an expression indicating a structure for the origin information in the field string.

The instructions may further cause the processor to receive a change to the parsing instructions and update the configuration file based on the change.

Translating the first binary sequence into the first textual sequence may include translating, using a library, the first binary sequence into a hexadecimal value and translating, using a specification, the hexadecimal value into the first textual sequence.

The instructions may further cause the processor to receive, from the RFID scanner, a second binary sequence produced by scanning a second RFID tag on a second part and translate the second binary sequence into a second textual sequence. The instructions may further cause the processor to determine, based on the configuration file and the second textual sequence, that the second RFID tag includes an error and display a message indicating the error.

The origin information may include at least one of a part number for the first part, a serial number for the first part, or a manufacturing date for the first part.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure describes a tracking system that uses a configuration file to store parsing instructions for information encoded by the RFID tags on parts (e.g., aeronautical parts). Each RFID tag may encode information about the part to which the RFID tag is attached. For example, the RFID tag may encode information such as the part number, serial number, manufacturer, manufacturing date, chain of custody, etc. for the part. This information may be encoded using field codes that identify the information and field strings that include the values for the information. Field strings for different field codes may use different syntax for storing or presenting the values.

The configuration file stores the field codes along with parsing instructions that indicate the syntax for the field strings for those field codes. When an RFID tag is scanned, the system may reference the configuration file to understand how to parse and interpret the information extracted from the RFID tag. Using the parsing instructions, the system may correctly interpret and understand the information encoded by the RFID tag. When a change or update occurs to the parsing instructions (e.g., adding instructions for new types of information and/or removing instructions for outdated or discontinued information), the configuration file may be updated to incorporate the change or update, rather than changing the software code for the tracking system and recompiling the software code.

In certain aspects, the tracking system provides several technical advantages. For example, by storing the parsing instructions in the configuration file, the parsing instructions may be updated or changed without needing to change or recompile the software code for the tracking system. As a result, the changes and updates to the parsing instructions may be quickly implemented in the tracking system relative to existing systems that hardcode the parsing instructions.

Figure 1:
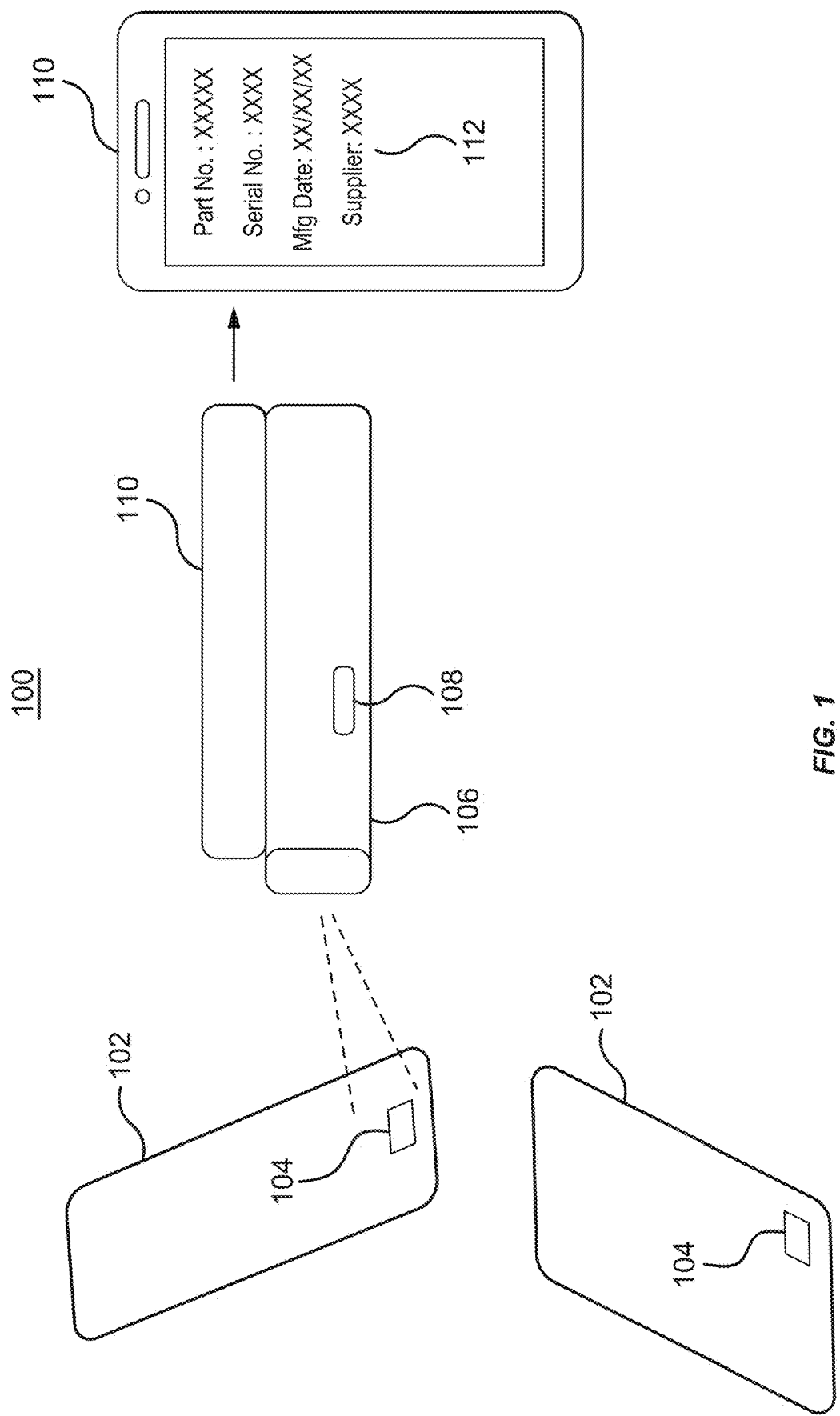
FIG. 1 illustrates an example system.

FIG. 1 illustrates an example system 100. As seen in FIG. 1, the system 100 includes parts 102 with RFID tags 104, a scanner 106 with a button 108, and a device 110. Generally, the scanner 106 scans the RFID tags 104 to retrieve information about the parts 102 encoded by the RFID tags 104. The device 110 then parses the information using a configuration file.

The parts 102 may be parts of an assembly. For example, the parts 102 may include aeronautical parts, which may be any component of an aircraft (e.g., airplane, rocket, etc.). The aeronautical parts may include wings, engines, rudders, panels, electronic components, seats, doors, pipes, buttons, lights, etc. An RFID tag 104 is attached to each part 102. The RFID tag 104 encodes information about the part 102. For example, the RFID tag 104 may encode origin information (e.g., a part number, serial number, manufacturing date, supplier, chain of custody, service history, etc.) for the part 102.

The scanner 106 is an RFID scanner that scans the RFID tags 104 to extract the information encoded by the RFID tags 104. For example, when the button 108 on the scanner 106 is pressed, the scanner 106 may emit electromagnetic waves (e.g., radio waves within Air Interface Protocol for Communications at 860 megaHertz (MHz) to 960 MHz) towards an RFID tag 104 on a part 102. These electromagnetic waves may provide electrical power to the RFID tag 104. The RFID tag 104 uses the electrical power in the electromagnetic waves to power electronic components in the RFID tag 104 (e.g., a chip and/or a radio) to transmit the information about the part 102 encoded by the RFID tag 104 as wireless signals back towards the scanner 106. The scanner 106 includes a radio that receives the wireless signals from the scanner 106.

The scanner 106 may include any mechanism for instructing the scanner 106 to scan. The example scanner 106 in the system 100 includes a button 108 that may be pressed to instruct the scanner 106 to scan. In other examples, the scanner 106 may include a trigger and/or a lever that may be pressed, pulled, and/or actuated to instruct the scanner 106 to scan. In some aspects, the scanner 106 does not include the button 108, a trigger, and/or a lever. Instead, the scanner 106 continuously or regularly emits electromagnetic waves when powered and waits to receive wireless signals transmitted by an RFID tag 104.

The scanner 106 transmits, to the device 110, the information in the wireless signal from the RFID tag 104. For example, the scanner 106 may wirelessly transmit the information to the device 110 (e.g., using wireless fidelity or Bluetooth signals). As another example, the device 110 may be coupled (e.g., to a port) on the scanner 106. The scanner 106 may communicate the information to the device 110 through the coupling. In the example of FIG. 1, the device 110 is physically coupled (e.g., to a port) of the scanner 106.

The device 110 translates and/or parses the information from the scanner 106. For example, the scanner 106 may provide the information to the device 110 as a binary sequence. The device 110 may translate the binary sequence textual sequence. The device 110 may then follow parsing instructions in a configuration file to parse the textual sequence and to translate the textual sequence into information 112 about the part 102. The information 112 may be origin information that describes the creation and transfer of the part 102. For example, the information 112 may include a part number, serial number, manufacturing date, supplier name, chain of custody, etc. for the part 102. The device 110 may then present the information 112 on a display of the device 110. A user of the device 110 may read the information 112 on the display to understand the origin information of the part 102. In some aspects, the device 110 stores the information 112 in a database to track the part 102 as the part 102 is assembled into an aircraft.

Figure 2:
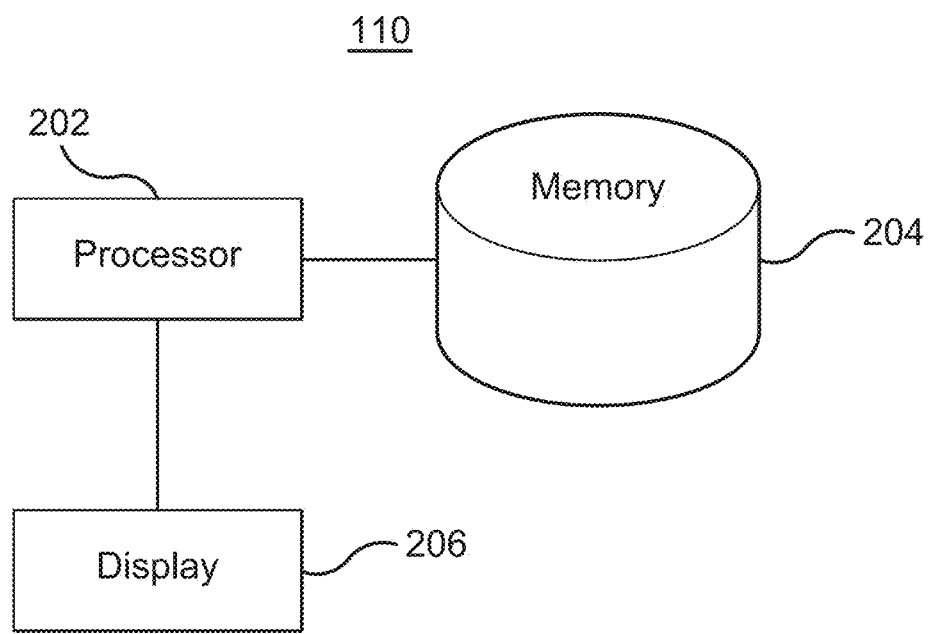
FIG. 2 illustrates an example device in the system of FIG. 1.

FIG. 2 illustrates an example device 110 in the system 100 of FIG. 1. Generally, the device 110 is any suitable device for communicating with components of the system 100, such as the scanner 106. As an example, and not by way of limitation, the device 110 may be a computer, a laptop, a wireless or cellular telephone, an electronic notebook, a personal digital assistant, a tablet, or any other device capable of receiving, processing, storing, or communicating information with other components of the system 100. The device 110 may be a wearable device such as a virtual reality or augmented reality headset, a smart watch, or smart glasses. The device 110 may also include a user interface, such as a display, a microphone, keypad, or other appropriate terminal equipment. As seen in FIG. 2, the device 110 may include a hardware processor 202, memory 204, a display 206, or circuitry configured to perform any of the functions or actions of the device 110 described herein. For example, a software application designed using software code may be stored in the memory 204 and executed by the processor 202 to perform the functions of the device 110.

The processor 202 is any electronic circuitry, including, but not limited to one or a combination of microprocessors, microcontrollers, application specific integrated circuits (ASIC), application specific instruction set processor (ASIP), and/or state machines, that communicatively couples to the memory 204 and controls the operation of the device 110. The processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 202 may include other hardware that operates software to control and process information. The processor 202 executes software stored on the memory 204 to perform any of the functions described herein. The processor 202 controls the operation and administration of the device 110 by processing information (e.g., information received from the scanner 106 and memory 204). The processor 202 is not limited to a single processing device and may encompass multiple processing devices contained in the same device or computer or distributed across multiple devices or computers. The processor 202 is considered to perform a set of functions or actions if the multiple processing devices collectively perform the set of functions or actions, even if different processing devices perform different functions or actions in the set.

The memory 204 may store, either permanently or temporarily, data, operational software, or other information for the processor 202. The memory 204 may include any one or a combination of volatile or non-volatile local or remote devices suitable for storing information. For example, the memory 204 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 204, a disk, a CD, or a flash drive. In particular aspects, the software may include an application executable by the processor 202 to perform one or more of the functions described herein. The memory 204 is not limited to a single memory and may encompass multiple memories contained in the same device or computer or distributed across multiple devices or computers. The memory 204 is considered to store a set of data, operational software, or information if the multiple memories collectively store the set of data, operational software, or information, even if different memories store different portions of the data, operational software, or information in the set.

The display 206 includes electronic components that visually present information from the device 110. In some aspects, the display 206 may include a touchscreen that receives touch input from a user. The device 110 uses the display 206 to present the information 112 from an RFID tag 104 on a part 102.

Figure 3:
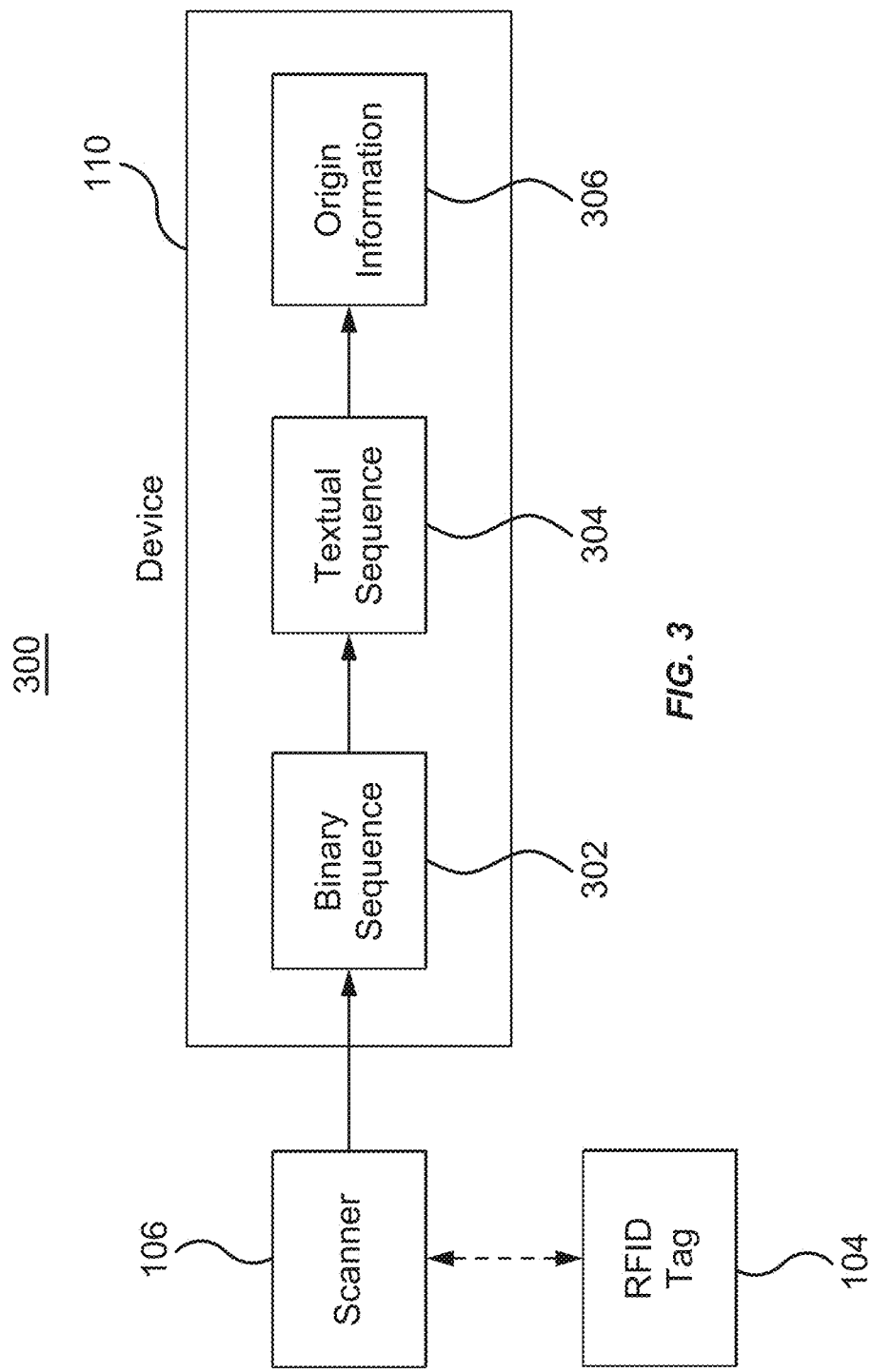
FIG. 3 illustrates an example operation performed by the system of FIG. 1.

FIG. 3 illustrates an example operation 300 performed by the system 100 of FIG. 1. Generally, the components of the system 100 perform the operation 300. By performing the operation 300, the components of the system 100 extract information about aeronautical parts.

As seen in FIG. 3, the operation 300 begins with the scanner 106 scanning the RFID tag 104 on a part 102 (e.g., an aeronautical part). The RFID tag 104 wirelessly transmits the information to the scanner 106. The scanner 106 transmits the information to the device 110 as a binary sequence 302. The binary sequence 302 may include any number of bits that encapsulate the information encoded by the RFID tag 104.

The device 110 then translates the binary sequence 302 into a textual sequence 304. Generally, the device 110 may perform multiple translations to generate the textual sequence 304 from the binary sequence 302. For example, the device 110 may use one or more libraries or specifications to translate the binary sequence 302 into the textual sequence 304. The textual sequence 304 may include textual values (e.g., field keys and field sequences) that encapsulate origin information 306 for the part 102.

The device 110 uses a configuration file to translate the textual sequence 304 to the origin information 112. The configuration file includes parsing instructions that indicate how certain fields encoded in the textual sequence 304 should be parsed and translated. By following these parsing instructions, the device 110 determines the origin information 306 from the textual sequence 304. The origin information 306 may include a part number, serial number, manufacturing date, manufacturer, supplier, service history, and chain of custody information for the part 102. The device 110 may then display the origin information 306.

In certain aspects, because the device 110 uses the configuration file to parse and translate the information in the RFID tag 104 into the origin information 306, it is easier to update the parsing instructions relative to systems that write the parsing instructions into the software code. For the device 110, updating the parsing instructions may involve updating or changing the configuration file without recompiling the software code.

Figure 4:
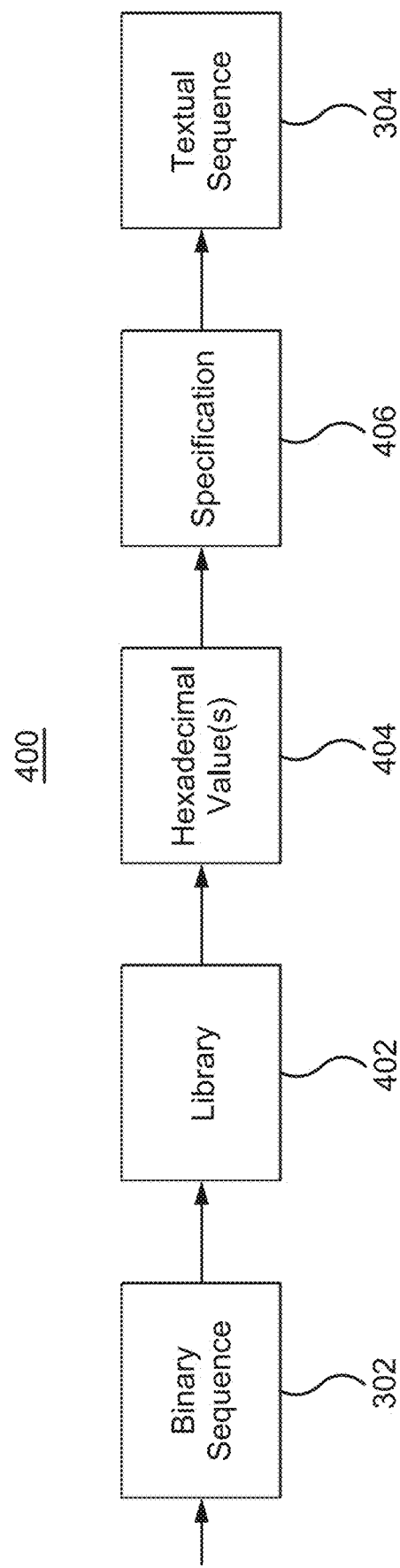
FIG. 4 illustrates an example operation performed by the system of FIG. 1.

FIG. 4 illustrates an example operation 400 performed by the system 100 of FIG. 1. Generally, the device 110 performs the operation 400. By performing the operation 400, the device 110 translates the binary sequence 302 into the textual sequence 304.

The device 110 begins by receiving the binary sequence 302 from the scanner 106. As discussed previously, the device 110 may receive the binary sequence 302 wirelessly from the scanner 106 (e.g., using wireless fidelity or Bluetooth), or the device 110 may receive the binary sequence 302 through physical connection with the scanner 106 (e.g., through a wired connection at a port of the scanner 106). The device 110 uses a library 402 to translate the binary sequence 302 into a hexadecimal value 404. For example, the library 402 may be an RFID library that indicates how different portions of the binary sequence 302 should be separated from each other and translated into different hexadecimal values 404. The device 110 follows the instructions in the RFID library to convert the binary sequence 302 into hexadecimal values 404.

The device 110 may also use a specification 406 to translate the hexadecimal values 404 into the textual sequence 304. In some aspects, the specification 406 is the Air Transport Association Chapter 9 Specifications. The specification 406 may indicate textual sequences for different hexadecimal values. The device 110 uses the specification 406 to translate the hexadecimal values 404 into different textual sequences. The device 110 then combines these different textual sequences to form the textual sequence 304.

Figure 5:
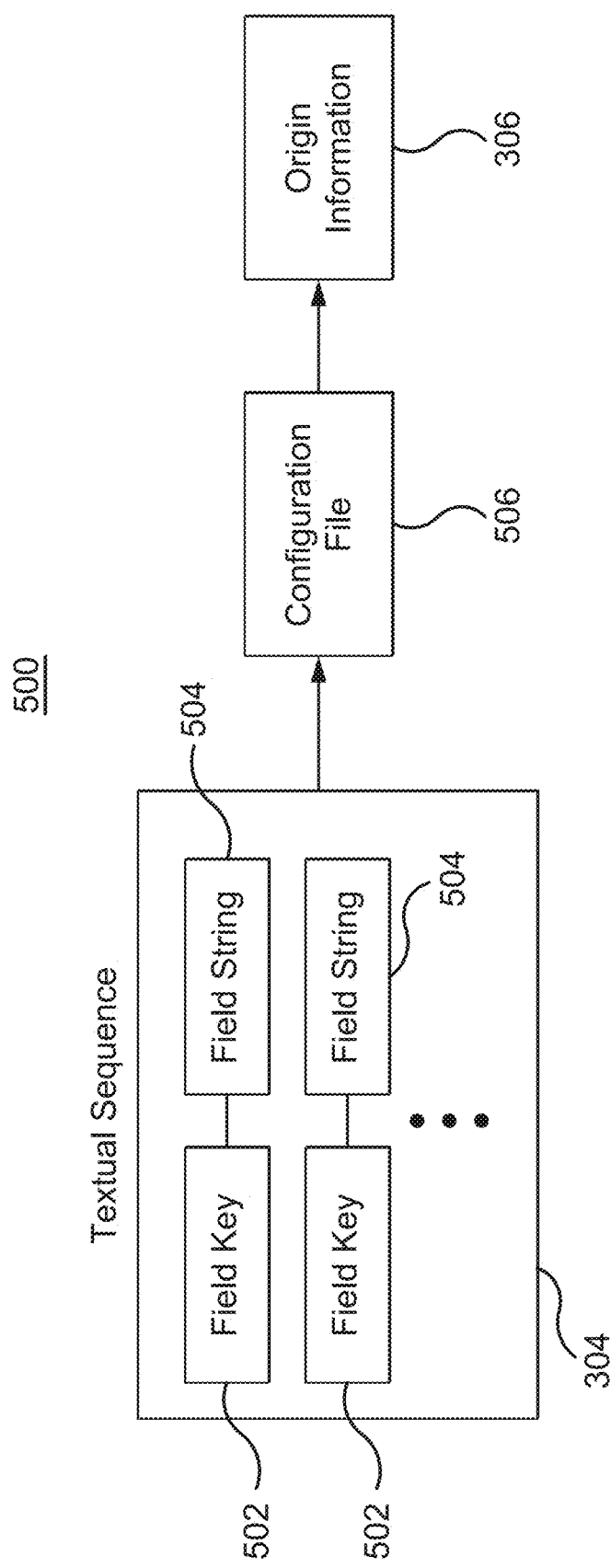
FIG. 5 illustrates an example operation performed by the system of FIG. 1.

FIG. 5 illustrates an example operation 500 performed by the system 100 of FIG. 1. Generally, the device 110 performs the operation 500. By performing the operation 500, the device 110 translates the textual sequence 304 into the origin information 306 for the part 102.

As seen in FIG. 5, the textual sequence 304 includes different fields for different aspects or types of origin information 306. For example, the textual sequence 304 may include multiple field keys 502 and corresponding field strings 504. Generally, the field keys 502 are codes that indicate certain types of origin information (e.g., part number, serial number, manufacturing date, manufacturer, etc.). The corresponding field strings 504 may indicate values for the field keys 502. As an example, a field key 502 may indicate that the field indicates a part number, and the corresponding field string 504 may indicate the value of the part number. Different field keys 502 and field strings 504 may follow different syntaxes to encode different types of origin information 306.

The device 110 uses the configuration file 506 to translate the field keys 502 and field strings 504 in the textual sequence 304 into the origin information 306. Generally, the configuration file 506 includes parsing instructions that describe how different field keys 502 and field strings 504 should be parsed to extract the different types of origin information 306 encapsulated by the field keys 502 and field strings 504. For example, the parsing instructions may indicate the different syntaxes used by the different field keys 502. The device 110 may use the syntaxes indicated by the configuration file 506 to translate the field keys 502 and field strings 504 into the origin information 306.

In some aspects, the configuration file 506 is a file that is separate from the software code used by the device 110. For example, the configuration file 506 may be a separate file that may be opened, edited, and/or closed independent of the software executables or programs used by the device 110 to translate the textual sequence 304 into the origin information 306. Stated differently, the configuration file 506 may be opened, edited, and/or closed without opening or interacting with the software executables or programs used by the device 110 to translate the textual sequence 304. The configuration file 506, however, may be kept in the same folders or directories as the software executables or programs.

Figure 6:
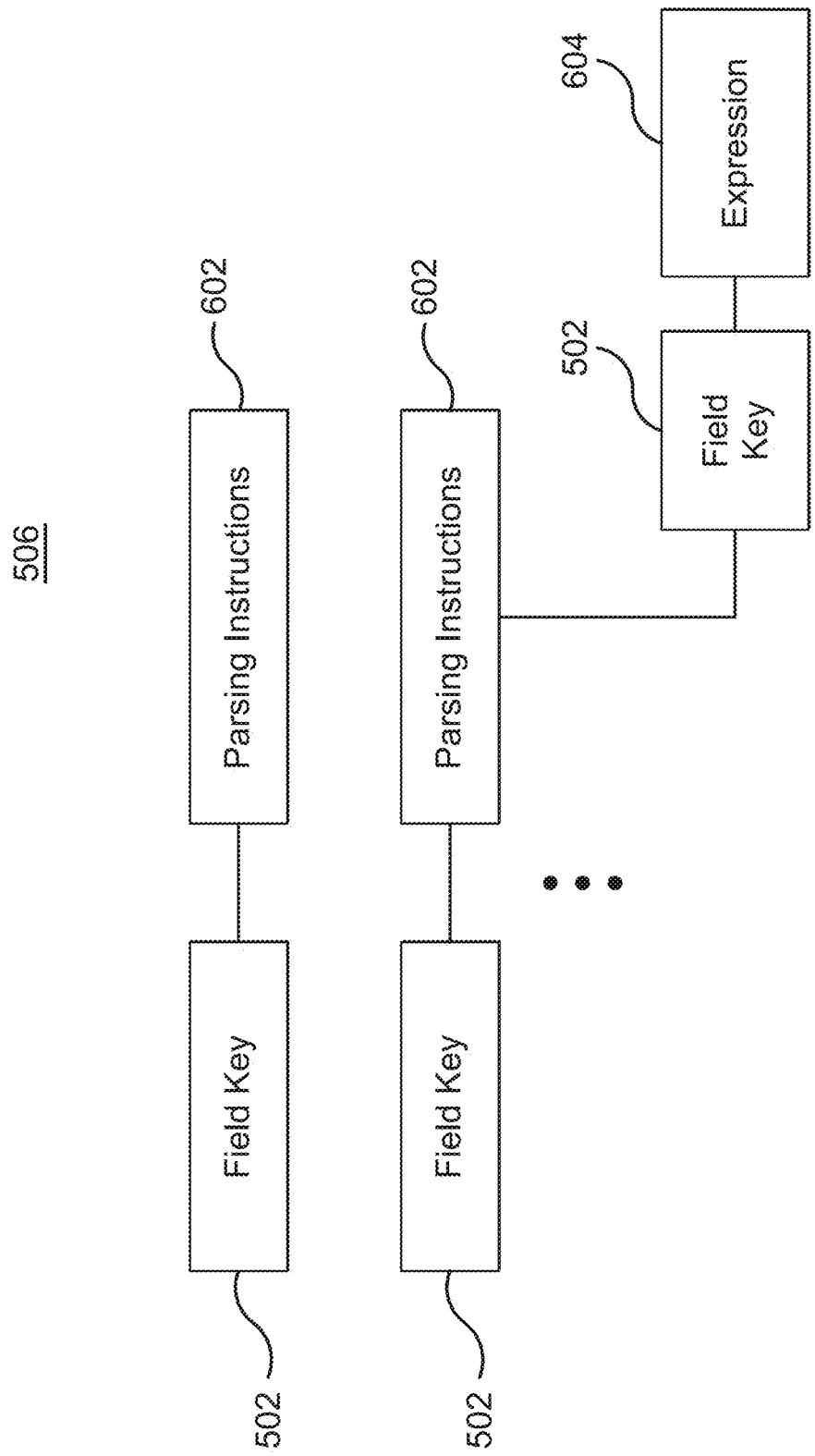
FIG. 6 illustrates an example configuration file in the system of FIG. 1.

FIG. 6 illustrates an example configuration file 506 in the system 100 of FIG. 1. As seen in FIG. 6, the configuration file indicates various field keys 502 and corresponding parsing instructions 602. The parsing instructions 602 for a field key 502 may indicate the syntax used by the field key 502. For example, the parsing instructions 602 may indicate how the information in the field string 504 for the field key 502 is structured and organized.

In the example of FIG. 6, the parsing instructions 602 for a field key 502 may include the field key 502 and an expression 604. The field key 502 and the expression 604 in the parsing instructions 602 may be organized to show how the textual sequence 304 structures or organizes the information in the field key 502 and the corresponding field string 504. For example, for a part number, the parsing instructions 602 may indicate the field key 502 for part number (e.g., PNR). The parsing instructions 602 may also include an expression 604 that indicates a space follows the field key 502 (e.g., \s{1}) and that a word with one to thirty-two characters follows the space (e.g., (\w{1, 32})). This word may be the part number for the part 102. As another example, for a manufacturer, the parsing instructions 602 may indicate the field key 502 for manufacturer (e.g., MFR). The parsing instructions 602 may also include an expression 604 that indicates a space follows the field key 502 (e.g., \s{1}) and that a word with five characters follows the space (e.g., (\w{5}). This word may be an identifier for the manufacturer. The device 110 may use the parsing instructions 602 in the configuration file 506 to translate the field keys 502 and field strings 504 in the textual sequence 304 into origin information 306.

Figure 7:
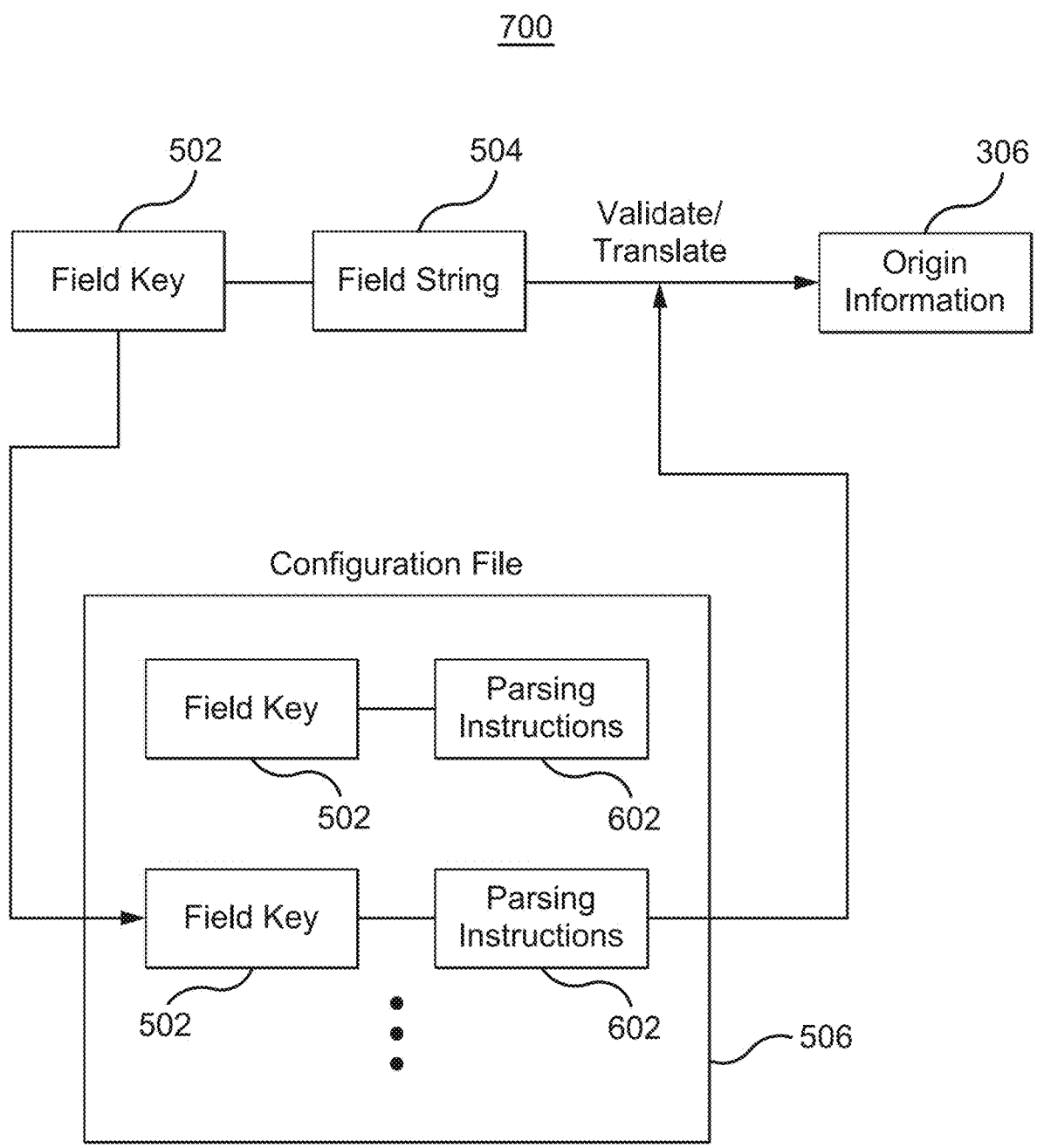
FIG. 7 illustrates an example operation performed by the system of FIG. 1.

FIG. 7 illustrates an example operation 700 performed by the system 100 of FIG. 1. Generally, the device 110 performs the operation 700. By performing the operation 700, the device 110 translates a field key 502 and corresponding field string 504 into origin information 306.

As seen in FIG. 7, the device 110 begins by referencing the configuration file 506 using the field key 502. For example, the device 110 may locate a matching field key 502 in the configuration file 506. The device 110 then determines the parsing instructions 602 corresponding to the located field key 502. The device 110 uses the parsing instructions 602 to translate the field strings 504 into the origin information 306. For example, the parsing instructions 602 may indicate the syntax used by the field string 504 to encapsulate the origin information 306. The device 110 uses the syntax to decode or extract the origin information 306 in the field string 504.

In certain aspects, the device 110 uses the parsing instructions 602 to validate the field string 504. In some instances, errors may be introduced into the field string 504. For example, the scanner 106 may scan the RFID tag 104 incorrectly or errors may occur when communicating signals between the scanner 106 and the device 110. Because the parsing instructions 602 indicate how information should be structured or organized in the field string 504, the device 110 may use the parsing instructions 602 to detect when certain error have been introduced into the field string 504. If the device 110 detects no errors in the field string 504, the device 110 may validate the field string 504. If the device 110 detects errors in the field string 504, the device 110 may indicate the error.

Figure 8:
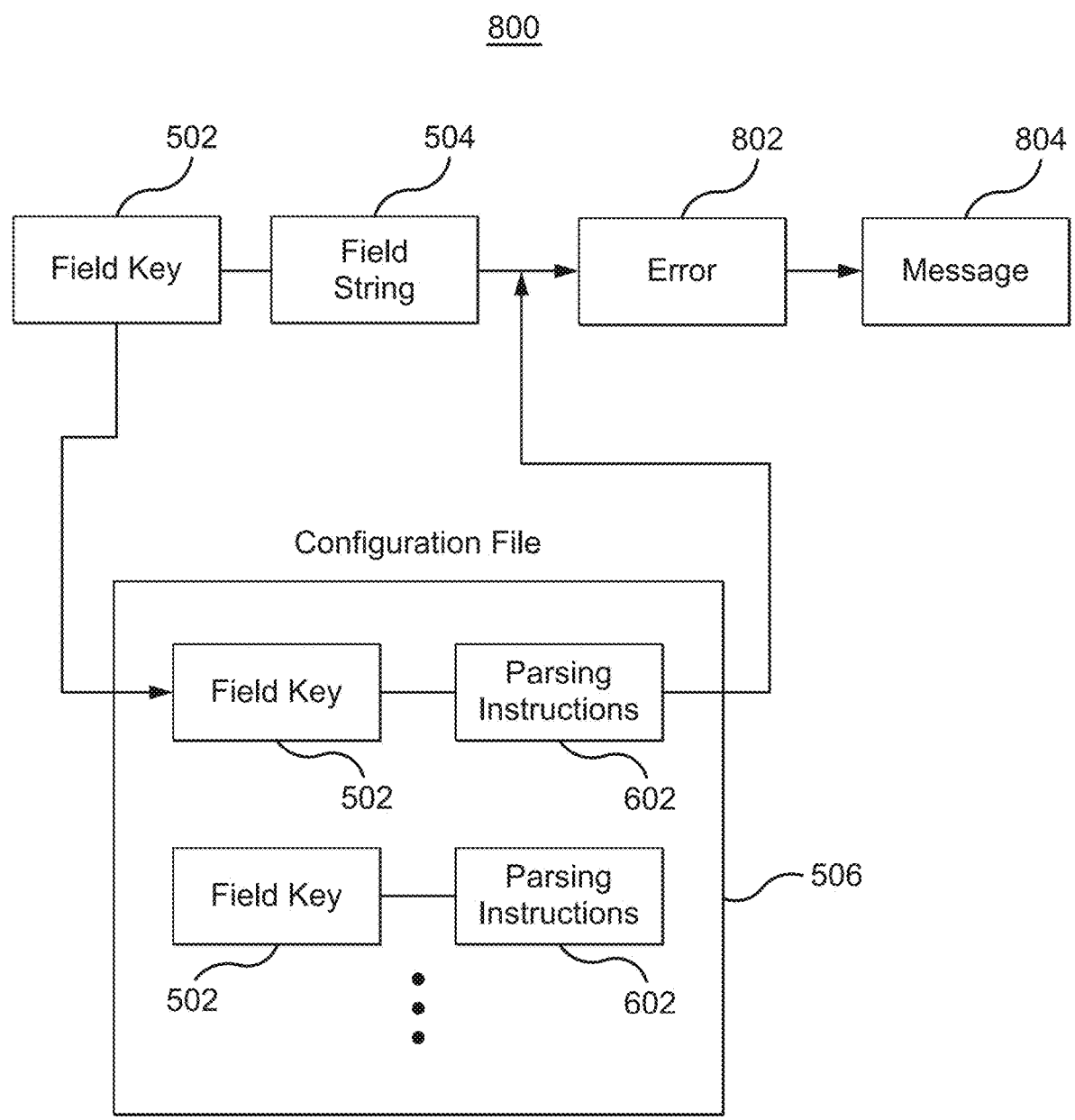
FIG. 8 illustrates an example operation performed by the system of FIG. 1.

FIG. 8 illustrates an example operation 800 performed by the system 100 of FIG. 1. Generally, the device 110 performs the operation 800. By performing the operation 800, the device 110 determines errors in the field strings 504.

As discussed above, the device 110 uses the parsing instructions 602 to determine errors in the field strings 504. As seen in FIG. 8, the device 110 determines, from the parsing instructions 602 in the configuration file 506 that a field string 504 includes an error 802. For example, the device 110 may determine that the field string 504 does not follow the syntax indicated by the parsing instructions 602. In response, the device 110 may stop translating the field string 504 into the origin information 306. Instead, the device 110 may generate a message 804 that indicates the error 802. The device 110 may display the message 804 to indicate the error 802 to a user. The user may then attempt to remedy the error. For example, the user may use the scanner 106 to rescan the RFID tag 104. As another example, the user may swap out the part 102 with another part 102 that has another RFID tag 104 or swap out the RFID tag 104 with another RFID tag 104 (e.g., after receiving the needed permissions or authorizations).

Figure 9:
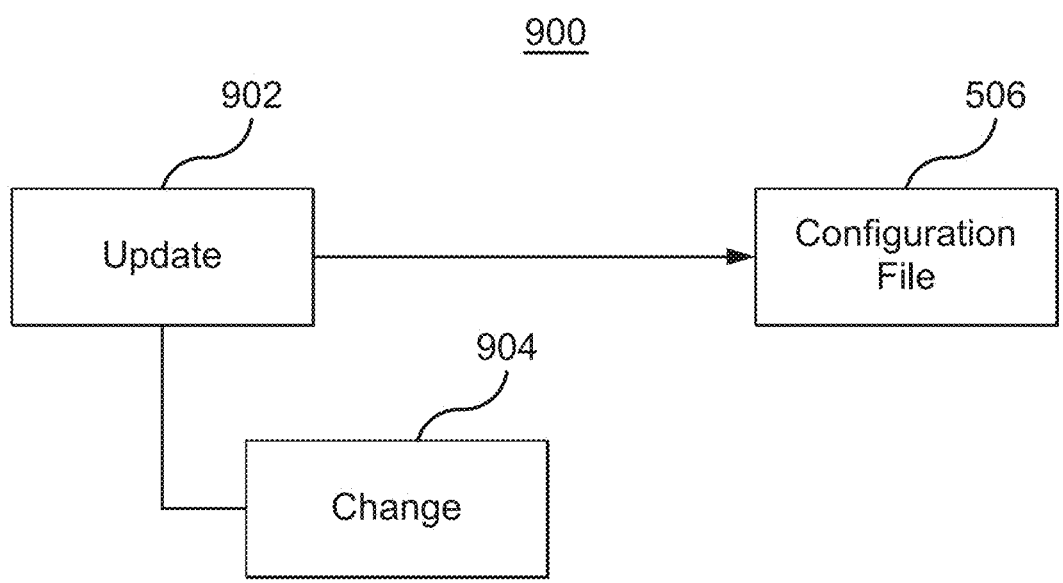
FIG. 9 illustrates an example operation performed by the system of FIG. 1.

FIG. 9 illustrates an example operation 900 performed by the system 100 of FIG. 1. Generally, the device 110 performs the operation 900. By performing the operation 900, the device 110 updates the configuration file 506.

The device 110 receives an update 902 that indicates a change 904 to the configuration file 506. For example, the update 902 may indicate parsing instructions for new field keys to be added to the configuration file 506. As another example, the update 902 may indicate that certain field keys and corresponding parsing instructions should be removed from the configuration file 506. As another example, the update 902 may indicate a change that should be made to an existing parsing instruction and/or field key in the configuration file 506.

The device 110 applies the update 902 to the configuration file 506 to incorporate the changes 904 to the configuration file 506. For example, the device 110 may add, remove, or change parsing instructions in the configuration file 506. By updating the configuration file 506, the device 110 changes how the device 110 parses and translates the textual sequence 304 into the origin information 306. The device 110, however, may not need to recompile software executables or programs due to the change in the configuration file 506. For example, the software executables or programs may load the configuration file 506 at runtime, which causes the software executables or programs to load the changes to the configuration file 506. As a result, the device 110 may how the device 110 parses and translates the textual sequence 304 without recompilation.

Figure 10:
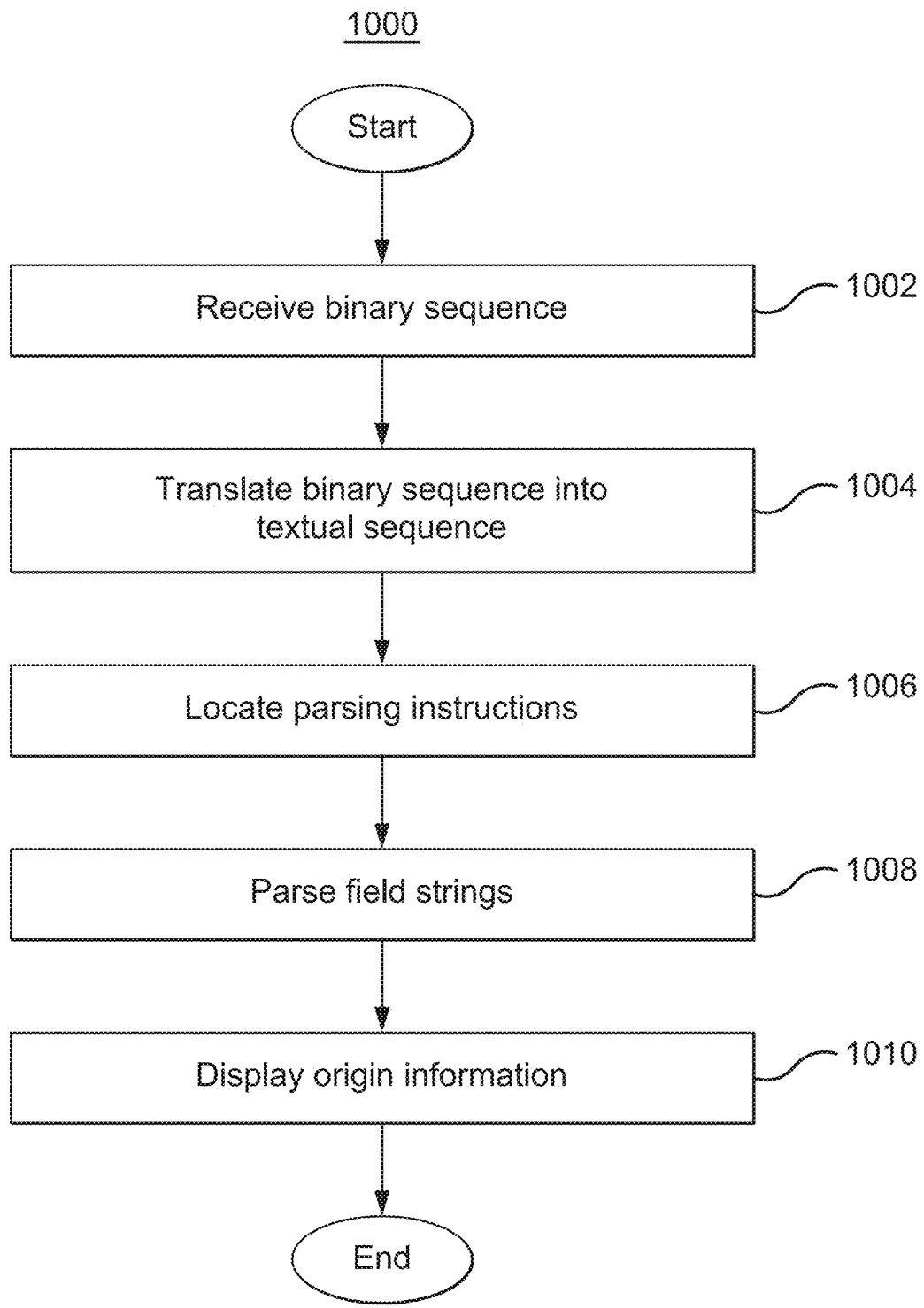
FIG. 10 is a flowchart of an example method performed by the system of FIG. 1.

FIG. 10 is a flowchart of an example method 1000 performed by the system 100 of FIG. 1. In certain aspects, the device 110 performs the method 1000. By performing the method 1000, the device 110 translates a binary sequence 302 into origin information 306 for a part 102.

In block 1002, the device 110 receives the binary sequence 302. For example, the device 110 may receive the binary sequence 302 from a scanner 106. The scanner 106 may scan an RFID tag 104 on the part 102. The RFID tag 104 may encode the origin information 306 for the part 102. By scanning the RFID tag 104, the scanner 106 produces the binary sequence 302 that encodes the information on the RFID tag 104.

In block 1004, the device 110 translates the binary sequence 302 into a textual sequence 304. Generally, the device 110 may use libraries and/or specifications to translate the binary sequence 302 into the textual sequence 304. For example, the device 110 may use an RFID library to translate the binary sequence 302 into a hexadecimal value 404. The device 110 may then use a specification 406 to translate the hexadecimal value 404 into the textual sequence 304. The specification 406 may be the Air Transport Association Chapter 9 Specifications. The textual sequence 304 may include field keys 502 and corresponding field strings 504 that encapsulate the origin information 306.

In block 1006, the device 110 locates parsing instructions 602. For example, the device 110 may locate, in a configuration file 506, the field keys 502 that appear in the textual sequence 304. The configuration file 506 may indicate parsing instructions 602 that correspond to these field keys 502. The parsing instructions 602 may indicate a syntax for the field strings 504 corresponding to the field keys 502. For example, the parsing instructions 602 may indicate the structure and organization of the information encapsulated in the field strings 504.

In block 1008, the device 110 parses the field strings 504 in the textual sequence 304 to extract the origin information 306 in the field strings 504. The device 110 may parse the field strings 504 according to the parsing instructions 602 for the field strings 504. By parsing the field strings 504, the device 110 extracts the origin information 306 encapsulated by the field strings 504. In block 1010, device 110 displays the origin information 306. A user may use the origin information 306 to track the part 102. For example, the user or the device 110 may input the origin information 306 into a database when the part 102 is installed into an aircraft.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. An apparatus comprising:
   a memory; and
   a processor communicatively coupled to the memory, the processor configured to:
   receive, from a radio frequency identifier (RFID) scanner, a first binary sequence produced by scanning a first RFID tag on a first part;
   translate the first binary sequence into a first textual sequence comprising a field key and a field string;
   locate, in a configuration file, parsing instructions for the field key; and
   parse the field string according to the parsing instructions to produce origin information for the first part.

2. The apparatus of claim 1, wherein the parsing instructions comprise the field key and an expression indicating a structure for the origin information in the field string.

3. The apparatus of claim 1, wherein the processor is further configured to:
   receive a change to the parsing instructions; and
   update the configuration file based on the change.

4. The apparatus of claim 1, wherein translating the first binary sequence into the first textual sequence comprises:
   translating, using a library, the first binary sequence into a hexadecimal value; and
   translating, using a specification, the hexadecimal value into the first textual sequence.

5. The apparatus of claim 1, wherein the processor is further configured to:
   receive, from the RFID scanner, a second binary sequence produced by scanning a second RFID tag on a second part;
   translate the second binary sequence into a second textual sequence;
   determine, based on the configuration file and the second textual sequence, that the second RFID tag includes an error; and
   display a message indicating the error.

6. The apparatus of claim 1, wherein the origin information comprises at least one of a part number for the first part, a serial number for the first part, or a manufacturing date for the first part.

7. The apparatus of claim 1, wherein the processor is further configured to validate the field string based on the parsing instructions.

8. A method comprising:
   receiving, from a radio frequency identifier (RFID) scanner, a first binary sequence produced by scanning a first RFID tag on a first part;
   translating the first binary sequence into a first textual sequence comprising a field key and a field string;
   locating, in a configuration file, parsing instructions for the field key;
   parsing the field string according to the parsing instructions to produce origin information for the first part; and
   displaying the origin information.

9. The method of claim 8, wherein the parsing instructions comprise the field key and an expression indicating a structure for the origin information in the field string.

10. The method of claim 8, further comprising:
receiving a change to the parsing instructions; and
updating the configuration file based on the change.

11. The method of claim 8, wherein translating the first binary sequence into the first textual sequence comprises:
translating, using a library, the first binary sequence into a hexadecimal value; and
translating, using a specification, the hexadecimal value into the first textual sequence.

12. The method of claim 8, further comprising:
receiving, from the RFID scanner, a second binary sequence produced by scanning a second RFID tag on a second part;
translating the second binary sequence into a second textual sequence;
determining, based on the configuration file and the second textual sequence, that the second RFID tag includes an error; and
displaying a message indicating the error.

13. The method of claim 8, wherein the origin information comprises at least one of a part number for the first part, a serial number for the first part, or a manufacturing date for the first part.

14. The method of claim 8, further comprising validating the field string based on the parsing instructions.

15. A non-transitory computer readable medium storing instructions that, when executed by a processor, cause the processor to:
receive, from a radio frequency identifier (RFID) scanner, a first binary sequence produced by scanning a first RFID tag on a first part;
translate the first binary sequence into a first textual sequence comprising a field key and a field string;
locate, in a configuration file, parsing instructions for the field key;
parse the field string according to the parsing instructions to produce origin information for the first part; and
display the origin information.

16. The medium of claim 15, wherein the parsing instructions comprise the field key and an expression indicating a structure for the origin information in the field string.

17. The medium of claim 15, wherein the instructions further cause the processor to:
receive a change to the parsing instructions; and
update the configuration file based on the change.

18. The medium of claim 15, wherein translating the first binary sequence into the first textual sequence comprises:
translating, using a library, the first binary sequence into a hexadecimal value; and
translating, using a specification, the hexadecimal value into the first textual sequence.

19. The medium of claim 15, wherein the instructions further cause the processor to:
receive, from the RFID scanner, a second binary sequence produced by scanning a second RFID tag on a second part;
translate the second binary sequence into a second textual sequence;
determine, based on the configuration file and the second textual sequence, that the second RFID tag includes an error; and
display a message indicating the error.

20. The medium of claim 15, wherein the origin information comprises at least one of a part number for the first part, a serial number for the first part, or a manufacturing date for the first part.

* * * * *